(12) United States Patent
Anshul

(10) Patent No.: US 9,092,789 B2
(45) Date of Patent: Jul. 28, 2015

(54) METHOD AND SYSTEM FOR SEMANTIC ANALYSIS OF UNSTRUCTURED DATA

(75) Inventor: Nishant Anshul, Bangalore (IN)

(73) Assignee: Infosys Limited (IN)

( * ) Notice: Subject to any disclaimer, the term of this patent is extended or adjusted under 35 U.S.C. 154(b) by 1073 days.

(21) Appl. No.: 12/417,862

(22) Filed: Apr. 3, 2009

(65) Prior Publication Data
US 2010/0049590 A1    Feb. 25, 2010

(30) Foreign Application Priority Data
Apr. 3, 2008   (IN) .............................. 837/CHE/2008

(51) Int. Cl.
*G06F 7/00* (2006.01)
*G06Q 30/02* (2012.01)
*G06F 17/27* (2006.01)

(52) U.S. Cl.
CPC ............ *G06Q 30/02* (2013.01); *G06F 17/2785* (2013.01); *G06Q 30/0203* (2013.01)

(58) Field of Classification Search
CPC ....................................................... G06Q 30/02
USPC ............. 705/1, 7.29; 706/62; 707/3, 5, 104.1, 707/737, 748, 749
See application file for complete search history.

(56) References Cited

U.S. PATENT DOCUMENTS

| | | | |
|---|---|---|---|
| 7,672,889 B2 * | 3/2010 | Brooks ....................... | 705/36 R |
| 7,930,302 B2 * | 4/2011 | Bandaru et al. ............... | 707/737 |
| 2007/0239792 A1 * | 10/2007 | Chen et al. ..................... | 707/200 |
| 2007/0294281 A1 * | 12/2007 | Ward et al. ..................... | 707/102 |
| 2008/0208820 A1 * | 8/2008 | Usey et al. ........................ | 707/3 |
| 2009/0217196 A1 * | 8/2009 | Neff et al. ..................... | 715/799 |

* cited by examiner

*Primary Examiner* — Hunter Wilder
(74) *Attorney, Agent, or Firm* — Lerner, David, Littenberg, Krumholz & Mentlik, LLP

(57) ABSTRACT

A method and system for semantically analyzing unstructured data in a customer feedback is provided. The method includes extracting data related to customer feedback from one or more input sources. The method further includes assigning weights to the one or more input sources and extracting relevant text from the feedback data. Further, sentences are detected from the customer feedback and are annotated. Thereafter, relevant adjectives are determined and are associated with sentence types. A rating is calculated for each sentence of the relevant text and output is provided in a pre-determined format.

18 Claims, 10 Drawing Sheets really love the G9. This is the perfect camera for street photography. It takes much sharper pictures than the typical point and shoot and it is much easier for me to carry around than my Canon XT. (I keep it in my messenger bag when I walk around the city. Poor quality control. SHAME ON CANON. I'm on my fourth unit. All of them have been defective:

Green cast on LCD edges when the LCD is black.

Tilted/crooked LCD screen 4 bad pixels (two red and two white)

Green case on LCD TOP AND BOTTOM

I've given up on getting a good unit and am keeping the last one. Of all the potential defects I've seen, the green cast on the LCD is the least bothersome (since you can only see it on dark images; in most normal cases you can't really detect it). Much rather have a bad screen than bad pixels.

I don't think I've really seen non-defective units of the G9....maybe at B&H at the store (where I bought mine), but now I think the lighting in the store just made it difficult to detect the defect (since when I looked at mine at the store, it was really hard to see the defect in the store lighting for some reason).

Again, I'm REALLY disappointed in Canon's quality control. They made a great camera, but not a single one I've seen is defect free. This is the only reason why I'm giving it 3 stars instead of 4 or 5. Finally, I give Amazon 5 stars for their customer service. Much better hassle free returns with Amazon than at one of the local big New York camera shops (they are good at making recommendations, but returns? forget about it).

- Simple Sentence:
  "Nokia has <u>nice</u> <u>robust</u> mobile phones for Indian markets." [+2 +1]

- Sentence with Conjunction:
  "Nokia 6101 is an <u>unpopular</u> model but with <u>awesome</u> battery life." [-1 +2]

- Interrogative Sentence:
  "Is Nokia 6600 a <u>good</u> phone?" [0]

- Sentences with Pronoun:
  "Nokia launched its new cell phone which has <u>good</u> audio features. It boasts of a <u>long</u> battery life but FM receiver is <u>not that good</u>." [+1 +1 -1]

- Sentence with Negation:
  "Nokia customer service is <u>not efficient</u>." [-1]

METHOD AND SYSTEM FOR SEMANTIC ANALYSIS OF UNSTRUCTURED DATA

FIELD OF INVENTION

The present invention relates generally to data mining. More particularly, the present invention provides for semantic analysis of unstructured data, such as customer feedback of a product or service.

BACKGROUND OF THE INVENTION

Organizations offering products and services to customers rely on customer feedback to improve quality of products or services. In one of the customary methods to obtain customer feedback, customers visiting a retail store of a company or firm are provided with a customer feedback form and their feedback is solicited on the form. The feedback received on the form is read by designated employees of the organization to understand the quality of feedback and its applicability in improving the products and services.

With the advent of technology and the Internet, customers prefer to buy products and services while being at home. Though this leads to ease of operations and more customer satisfaction, customer feedback is not obtained directly. One of the techniques to counter this problem includes providing a comments section on a website to obtain the feedback. The process of understanding the comments provided by customers is very cumbersome and painstaking.

A commonly used technique for acquiring customer feedback includes asking customers to rank products and services on offer, on a certain scale, in addition to obtaining textual feedback. Another technique existing in the art for obtaining customer feedback includes parsing through textual feedback and comparing the adjectives describing the products and services with a repository of adjectives to ascertain the essence of the feedback. However, words in English language have multiple usages and meanings with respect to their use as per various contexts. This makes the process of comparing adjectives used by a customer with stored adjectives, an inefficient process.

Consequently, there is need for a method and system that can interpret accurate meaning of feedback provided by customers in order to help organizations to improve their products and services.

BRIEF SUMMARY OF THE INVENTION

A method and system for semantically analyzing unstructured data is provided. In an embodiment of the present invention, the unstructured data is data related to customer feedback for a product or service.

In various embodiments of the present invention, the system includes a data extraction module configured to extract and refine unstructured data. Further, the system includes an information extraction module configured to detect sentences from the refined data and analyze the refined data in order to assign a rating to individual sentences of the customer feedback. The system also includes an information visualization module configured to render results of the semantic analysis of the customer feedback.

In an embodiment of the present invention, the data extraction module comprises a data source crawler for traversing through digital sources for obtaining text related to customer feedback, and a content extractor and formatter for stripping out irrelevant data. The system stores refined data in a production database.

In an embodiment of the present invention, the information extraction module comprises a UIMA annotation engine configured to detect sentences and annotate comments to the relevant text corresponding to a product and open NLP taggers configured to tag information to the relevant text for identifying parts of speech. Further, the system includes a grammar handler configured to determine the meaning of words used in the relevant text and a corpus of text models configured to provide a structured set of texts to the grammar handler. Further, the system includes a rating module configured to calculate rating of each comment of the customer feedback using a rating model.

In an embodiment of the present invention, the information visualization module comprises a dashboard integrated with the information extraction module and configured to display output of the calculation of ratings in a graphical format and a third party applications module integrated with the information extraction module and configured to interface with external applications to provide output of the calculation of ratings in at least one of an XML and RDF format. Further, the system includes Direct API calls module configured to provide analytical feeds to external applications, wherein the external applications conform to defined input and output message schemas.

In various embodiments of the present invention, the method includes searching the internet, intranet or any other source of data to find relevant documents. The source of data could be emails, news feeds, structured databases, files, customer call records or other sources of customer generated content such as blogs, discussion forums and the like. Further, the method includes assigning and varying weights of the data sources in terms of their importance, as perceived by the business. In an embodiment of the present invention, the parameters driving weight calculation are business alliance and proximity factor, frequency, of data updates, historical error factor, data size, number of concurrent system/user accesses. The relevant documents are defined as the documents have texts or patterns of texts deemed relevant by the business and as configured in the system.

In an embodiment of the present invention, the relevant text is cleansed and saved on a staging database. Further, sentences are detected from the relevant text and the relevant text is annotated and tagged using Natural Language Techniques. Furthermore, grammar rules, patterns, are applied to discover sentiments and/or opinions expressed in the relevant text.

In various embodiments of the present invention, an extensible integrated generic rating algorithm to determine value of language sentiments (positive, negative, neutral etc.) or business sentiments (any business defined concept) as expressed in the content, is used. Finally, the method includes the step of displaying the rating obtained in the form of graphs, charts, Extensible Markup language (XML) feeds and other object-oriented views.

BRIEF DESCRIPTION OF THE DRAWINGS

The present invention is described by way of embodiments illustrated in the accompanying drawings wherein:

FIG. 1 illustrates a sample feedback for a product on an online shopping website;

FIG. 5 illustrates exemplary test case sentences as part of customer feedback in accordance with an embodiment of the present invention;

FIG. 7 illustrates an online pre-rated review, in accordance with an embodiment of the present invention;

DETAILED DESCRIPTION

Figure 2:
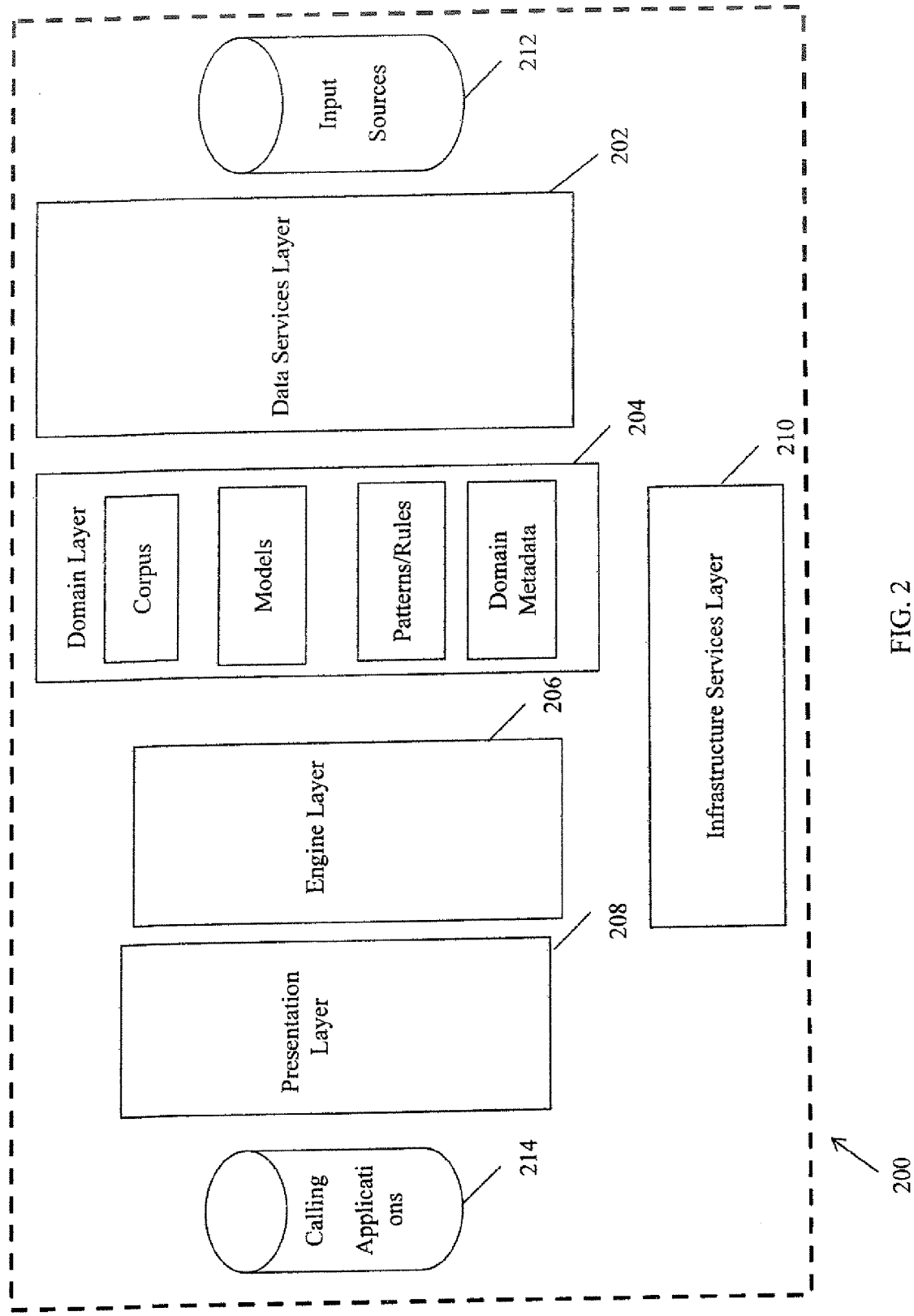
FIG. 2 illustrates an architectural block diagram of a system for the semantically analyzing unstructured data in accordance with an embodiment of the present invention.

A system and method for semantic analysis of unstructured data is provided. The present invention is more specifically directed towards analyzing customer feedback of products or services illustrated as unstructured data. An exemplary scenario in which the present invention may be implemented is customer review comments in data sources, such as, emails, news feeds, structured databases, files, customer call records or other source of customer generated content such as blogs, discussion forums etc.

In an embodiment of the present invention, the system and method disclosed provides extracting unstructured data from input sources by assigning and varying weights of the data sources in terms of their importance as perceived by business requirements.

In another embodiment of the present invention, the system and method disclosed provides cleansing the data, extracting relevant sentences from the data, annotating and tagging the data and calculating a rating for each sentence of the customer feedback.

In yet another embodiment of the present invention, the system and method disclosed provides displaying the output of the calculated ratings. In an example the output is displayed in a graphical format. In another example the output is provided to a third party application in a suitable format, such as object oriented views.

Hence, the present invention enables a time-efficient software design of a business process implementation. The present invention also enables changes in the software design in the requirements phase based on inputs from the stakeholders.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

FIG. 1 illustrates a sample feedback 100 for a product on an online shopping website. In various embodiments of the present invention, a customer after buying a product from an online shopping website of a company may leave feedback of the product in the comments section of the shopping website. The feedback may be relevant to the company in obtaining vital information about how the customer feels about the product. As shown in the figure, the feedback provided by the customer is in the form of unstructured data and hence is difficult to analyze automatically.

FIG. 2 illustrates an architectural block diagram of a system 200 for semantically analyzing unstructured data in accordance with an embodiment of the present invention. In various embodiments of the present invention, the customer feedback provided by customers of a product or service may include providing feedback in the form of text descriptions on company websites, product review sites, product related blogs and the like. The system 200 for analyzing customer feedback in the form of unstructured data includes a data services layer 202, a domain layer 204, an engine layer 206, a presentation layer 208, an infrastructure services layer 210, input sources, 212 and calling applications 214.

The data services layer 202 deals with data collection and data formatting. It includes software components for extracting data from input sources 212. In various embodiments of the present invention, the input sources 212 include sources of data related to customer feedback, such as, digital sources, the internet, company databases internal websites, fileservers, emails and news feeds. For example, the input sources 212 include emails, news feeds, structured databases, files, customer call records or other sources of customer generated content such as blogs, discussion forums and the like. The domain layer 204 includes a corpus of text models, various rules/patterns and components for creating/reading applicable domain ontologies.

The engine layer 206 includes the core engine components for processing the data extracted from the input sources 212 and interpreting the data to ascertain customer opinion regarding a product or service. The presentation layer 208 is used for rendering the system output in various modes, such as, graphs in a dashboard, integrated mode with appropriate third party applications using XML or Resource Description Framework (RDF) outputs and direct API level calls from other applications. The infrastructure services layer 210 provides the supporting infrastructure needed to meet various functional and non-functional requirements for processing the extracted data in order to determine the customer feedback, such as caching, notification, scheduling, logging, session management, security, multilingualism, and auditing.

Figure 3:
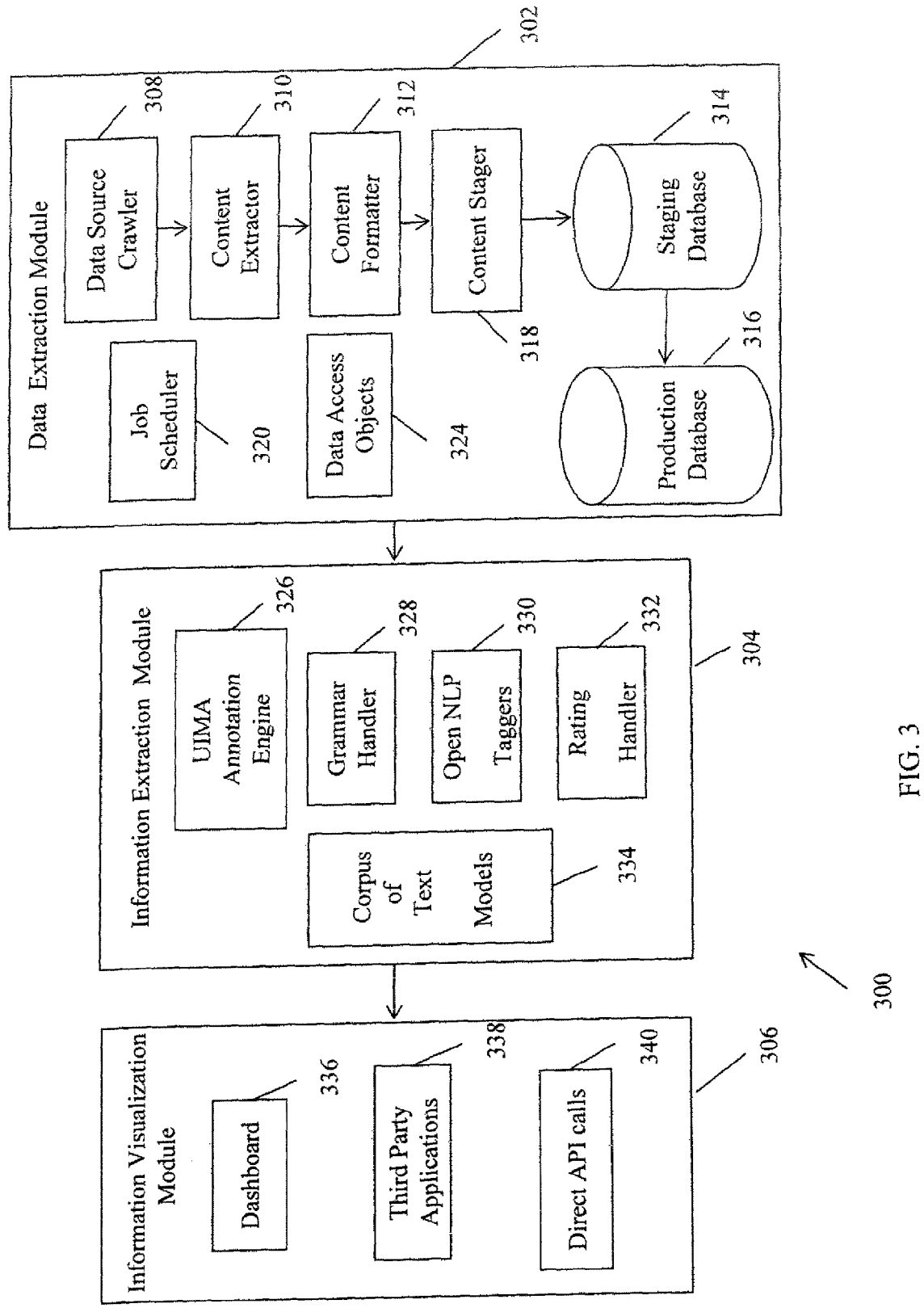
FIG. 3 illustrates a system including the software modules for semantic analysis of unstructured data in accordance with an embodiment of the present invention.

FIG. 3 illustrates a system 300 including software modules for semantic analysis of unstructured data in accordance with an embodiment of the present invention. The system 300 includes a data extraction module 302, an information extraction module 304, and an information visualization module 306.

The data extraction module 302 is a part of the data services layer 202 (FIG. 1). The data extraction module 302 includes a data source crawler 308, a content extractor 310, a content formatter 312, a staging database 314, a production database 316, a content stager 318, a job scheduler 320, and data access objects 324. The data source crawler 308 is an automated program that traverses through digital sources, for example, but not limited to, Internet, organization databases, internal websites, fileservers, emails, news feeds to obtain text related to customer feedback. In an embodiment of the present invention, the crawled information is about customer feedbacks, directly obtained from various above indicated data sources or from market research agencies, analyst reports etc. The feedbacks are on the products and/or services offered by a business. In an example, the data source crawler 308 downloads web pages and accesses them methodically to extract data. In an embodiment of the present invention, the data source crawler 308 is a multiple protocol conformant software component that crawls for general information about the products and services of a company on the Internet, company repositories, and internal websites. Examples of the protocols include Hyper Text Transfer Protocol (HTTP), Simple Mail Transfer Protocol (SMTP), File Transfer Protocol (FTP) and the like. In an example, the web crawler can also crawl for information for a specific product for a company. The web crawler collects text and metadata information stored on web pages displayed in various formats of markup languages such as, HTML, XML and the like. After the collection of data, the content extractor 310 and the content formatter 312 strips out the irrelevant data and extracts text relevant to the customer feedback. Thereafter, the relevant text is stored by the content stager 318 in the staging database 314 for more refinement as per business requirements. In an embodiment of the present invention, the staging database 314 is a database in which data is stored for data cleansing. Data cleansing includes removing, deleting or modifying corrupted data for later use. Upon data refinement and cleansing, the refined data is replicated onto the production database 316.

Refined data in the production database 316 is accessible to any user or system. In an embodiment of the present invention, the refined data is accessed by a web server through the data access objects 324. In an embodiment, the web server hosts the Information Extraction Module 304. In an embodiment of the present invention, the data extraction module implements a method to assign numeric weights on the refined data sources in terms of the perceived business importance attributed to them. The parameters driving the weight assignment methods are business alliance and proximity factor, frequency of data updates, historical error factor, data size, number of concurrent system or user accesses. For example, news feed data source has weights of 0.7, 1.0, 0.8, 1.0, 0.9 on business alliance and proximity factor, frequency of data updates, historical error factor, data size, number of concurrent system or user accesses respectively; while external blogs may have weights as 0.2, 0.4, 0.2, 0.6, 0.2 similarly. These weight assignments are done thorough a matrix table and the values are influenced by business requirements, credibility factors and any other applicable situations. Regression techniques are applied over time to adjust for data errors, thus resulting in further update of the matrix table.

In various embodiments of the present invention, the data refined in the data extraction module 302 is passed on to the information extraction module 304. The information extraction module 304 includes an Unstructured Information Management Architecture (UIMA) Annotation Engine 326, a Grammar Handler 328, open Natural Language Processing (NLP) Tagger 330, a Rating Handler 332 and a Corpus of Text Models 334. Data imported into the Information Extraction Module 304 is text relevant to customer feedback provided for a product or service. This data is analyzed by the UIMA Annotation Engine 326 which breaks up all the sentences in the data. The UIMA Annotation Engine 326 uses sentence detection techniques to identify the type of the sentence, such as, interrogative, affirmative, negative, and the like. The relevant sentences are determined by a domain handler that works in conjunction with the UIMA Annotation Engine 326 by checking occurrences of business concepts and related product-specific concepts. The domain handler is part of the domain layer and it includes software components for reading, identifying and associating product-specific domain ontologies. For example, in the customer feedback illustrated in FIG. 1, a domain handler reads relevant text and obtains vital information about technical and product-specific features of a camera. The UIMA Annotation Engine 326 retrieves comments about the "Noise" and "LCD" features of the camera. Here camera is the business concept and "Noise" and "LCD" are related product-specific concepts.

In an embodiment of the present invention, the UIMA Annotation Engine 326 divides the sentences from a customer feedback that are relevant to a product into tokens of words. Each token of words is then tagged by the open NLP Tagger 330 for determining its part of speech. For example, "Nokia" is a NNP tag i.e. noun phrase, "has" is a VB tag i.e. a verb etc. The UIMA Annotation Engine 326 then annotates comments to a specific product Annotation is looking for a pattern of words/alphabets and then marking them in the given text, generally following a look-up approach. Tagging is a technique where individual words are tagged in the given test by referring to a lexicon, generally using a machine learning approach. Thereafter, the grammar handler 328 and the corpus of text models 334 are used to understand the sentiments expressed in the customer feedback. The grammar handler 328 is a software component containing grammatical rules and linguistic patterns that are used to determine the meaning of words as used in the feedback sentences. A corpus of text models is a software module containing numerous structured set of texts. In an embodiment of the present invention, the corpus of text models 334 includes models obtained from existing popular sources, for example, the Wall Street Journal and the Brown corpus. In another embodiment of the present invention, the corpus of text models include domain-based corpus created by the Information Extraction Module 304. Creating a domain-based corpus includes defining business-specific domain metadata from sample customer feedback, and creating, training, and testing the domain-based corpus using test datasets. The grammar handler 328 extracts adjectives from sentences of a customer feedback. Extraction of adjectives from exemplary test case sentences of product review is illustrated in conjunction with the description of FIG. 5. The rating handler 332 rates the words extracted by the grammar handler to obtain a rating for each comment provided by the customer. The ratings are provided based on a rating model as described in conjunction with the description of FIG. 6. In some cases, pre-rated reviews of a product might be provided on websites. In an embodiment of the present invention, the Information Extraction Module 304 may include a pre-rating handler that extracts relevant information from pre-rated reviews of the product or service on the websites. The relevant information includes ratings provided on such websites by product reviewers. In various embodiments of the present invention, content from the rating handler 332 is aggregated with rating from a pre-rating handler to obtain an overall rating for each feature of the product. Finally, the output is presented to a user in different modes.

Figure 10:
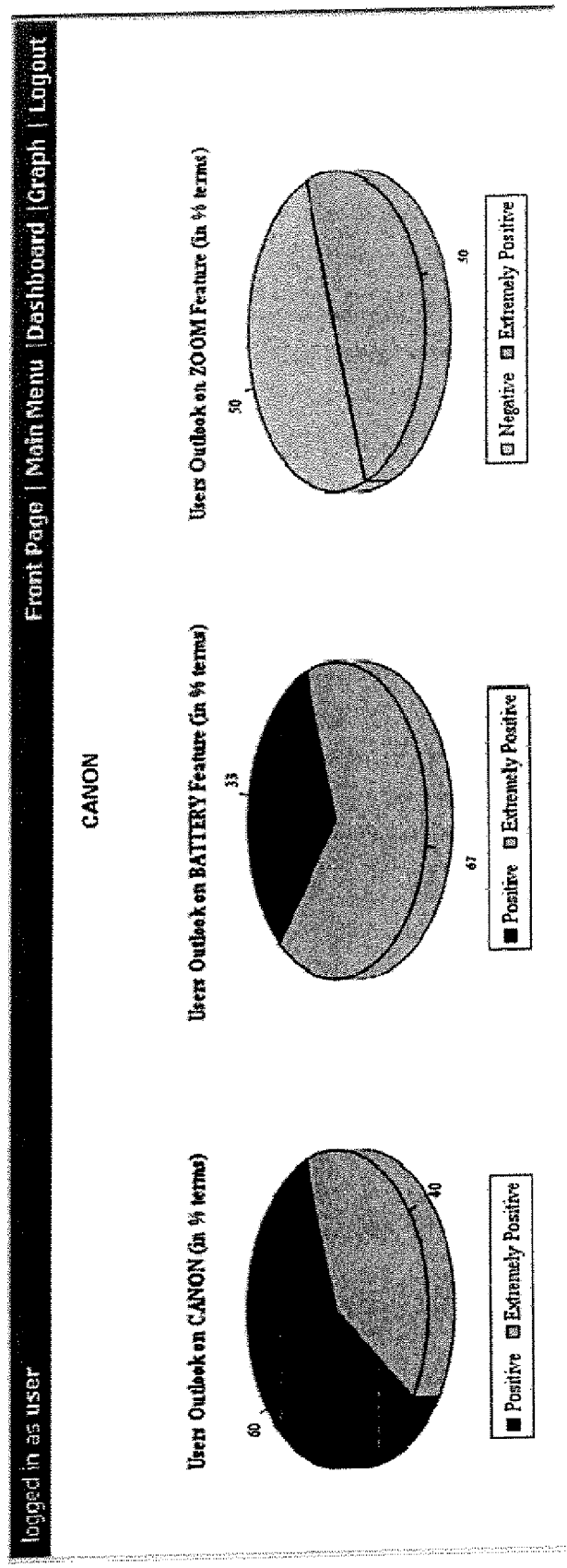
FIG. 10 illustrates an exemplary dashboard for providing output in accordance with an embodiment of the present invention.

The Information Visualization Module 306 includes software modules for rendering the results of semantic analysis of customer feedback. In an embodiment of the present invention, the Information Visualization Module 306 includes the software modules: a dashboard 336, third party applications 338 and Direct Application Programming Interface (API) calls 340. The dashboard 336 defines various analysis criteria around business concepts, such as, products, features, themes etc. These analysis criteria are then run over the business data and graphs/charts and reports are displayed to a system user. FIG. 10 illustrates screenshots of exemplary results displayed on the dashboard 336, in accordance with an embodiment of the present invention.

The software module, Third Party Applications 338, includes applications external to the system 300 that are used by the system 300 for data visualizations. In an embodiment of the present invention, an application takes XML or RDF feeds and then shows them in a refined, often object-oriented views. An example of such a third party application is a Siderean Navigator. A third party application receives a ready XML/RDF output from the Information Extraction Module 304.

In various embodiments of the present invention, the Information Visualization Module 306 includes a module "Direct Application Programming Interface (API) calls" 340, which contains API's through which applications can demand analytical feeds directly at the application level provided they conform to defined input and output message schemas.

Figure 4:
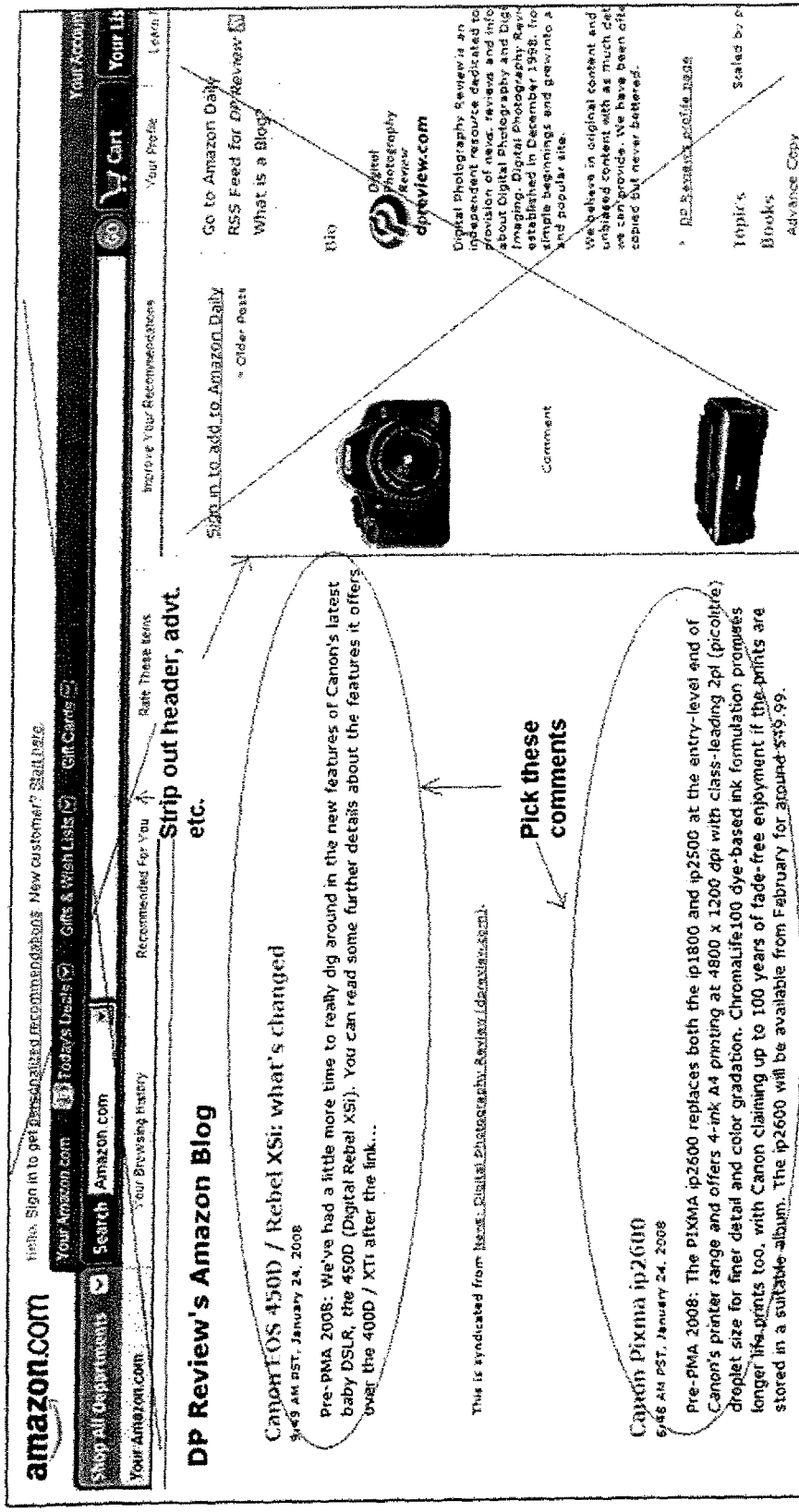
FIG. 4 illustrates an example of collecting relevant text from customer feedback.

FIG. 4 illustrates an example of collecting relevant text from customer feedback. As shown in the figure, the circled text 402 includes comments relevant to customer feedback for a camera whereas the crossed text 404 pertains to general information about the review website.

FIG. 5 illustrates exemplary test case sentences as part of customer feedback, in accordance with an embodiment of the present invention. In various embodiments of the present invention, a grammar handler extracts adjectives from the test case sentences of a customer feedback and uses grammar rules for understanding the meaning of the feedback. The relevance of adjectives found in a sentence is dependent on the type of sentence. As shown in the figure, use of the words "unpopular" and "awesome" in a conjunctive sentence implies both negative and positive emotions of the customer. The grammar handler categorizes the type of sentence as a "Sentence with Conjunction" which is further combined with a rating mechanism to ascertain the feedback. In another example, use of the adjective "efficient" in the sentence "Nokia customer service is not efficient" conveys a negative emotion, since this is a sentence with negation.

Figure 6:
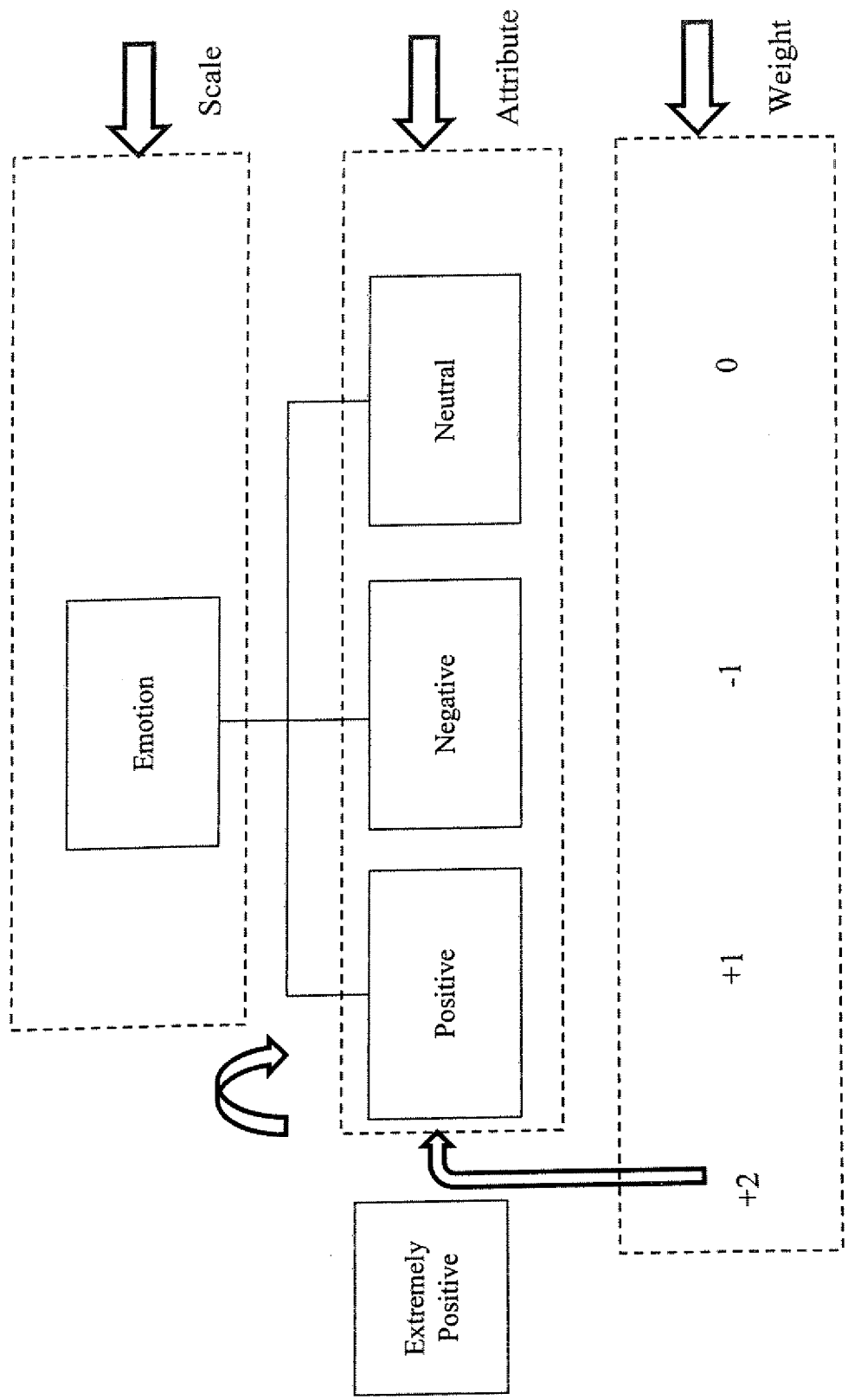
FIG. 6 illustrates a rating mechanism used for rating customer feedback.

FIG. 6 illustrates a rating mechanism used for rating customer feedback. A rating handler uses a grammar handler and a rating mechanism to rate the sentences input by a user as part of customer feedback. In an embodiment of the present invention, after the annotation of text and identification of relevant words as described in the description of FIG. 3, the rating handler rates the relevant words and obtains a rating for each relevant statement. As shown in the figure, the rating mechanism has three parameters—scale, attribute, and weight. In an example, the scale has been chosen as 'emotion'. The rating algorithm is generic in the sense that it can take a different scale as well like 'product defect'. In an embodiment of the present invention, multiple attributes are assigned to a scale that determines the "type" of the quality represented by the scale. For example, for the scale 'emotion', the attributes determined are 'positive, negative and neutral'. FIG. 6 indicates that a new attribute 'extremely positive' can also be used. Each attribute is given a weight, as shown in the figure. The respective weights of the "positive", "negative" and "neutral" emotion are +1, -1 and 0. Similarly, the weight of the "extremely positive" emotion is +2.

In an embodiment of the present invention, referring to FIG. 5, the first sentence "Nokia has nice robust phones for Indian market" has two adjectives 'nice' and 'robust'. The rating handler rates these words as per the rating mechanism described above. The word 'nice' is rated as an extremely positive attribute by the rating handler and hence gets a weight of '+2', whereas the word 'robust' is rated as a positive attribute and gets a weight of '+1'. The collective rating of the first sentence then becomes +3. Only relevant adjectives are picked up for consideration and their semantics are checked as well using the grammar handler. For example, the last entry 'Sentence with Negation' has an adjective 'efficient' but it is followed by negation 'Not'. So 'efficient' is taken in a negative context here and given a rating of '-1'.

In another embodiment of the present invention, an API and a user interface is provided to create domain based corpus using business supplied domain data and applicable ontologies. Relevant text is extracted using the domain based corpus and sentiment classification is done using a combination of the weights assigned by the rating handler and a search technique based on standard indexing and search libraries such as, Apache Lucene.

In yet another embodiment of the present invention, a custom corpus is created using an applicable business concept. For example, if 'convenient' is an applicable business concept, then a corpus is created using this concept. Additionally, language corpuses which can understand plain words, say, 'more', 'less' may also be used. In case, the business demands that a distinction be made between 'more convenient' and 'less convenient', then the system can use a hybrid approach utilizing both the above corpuses and classify them accordingly.

Figure 7:
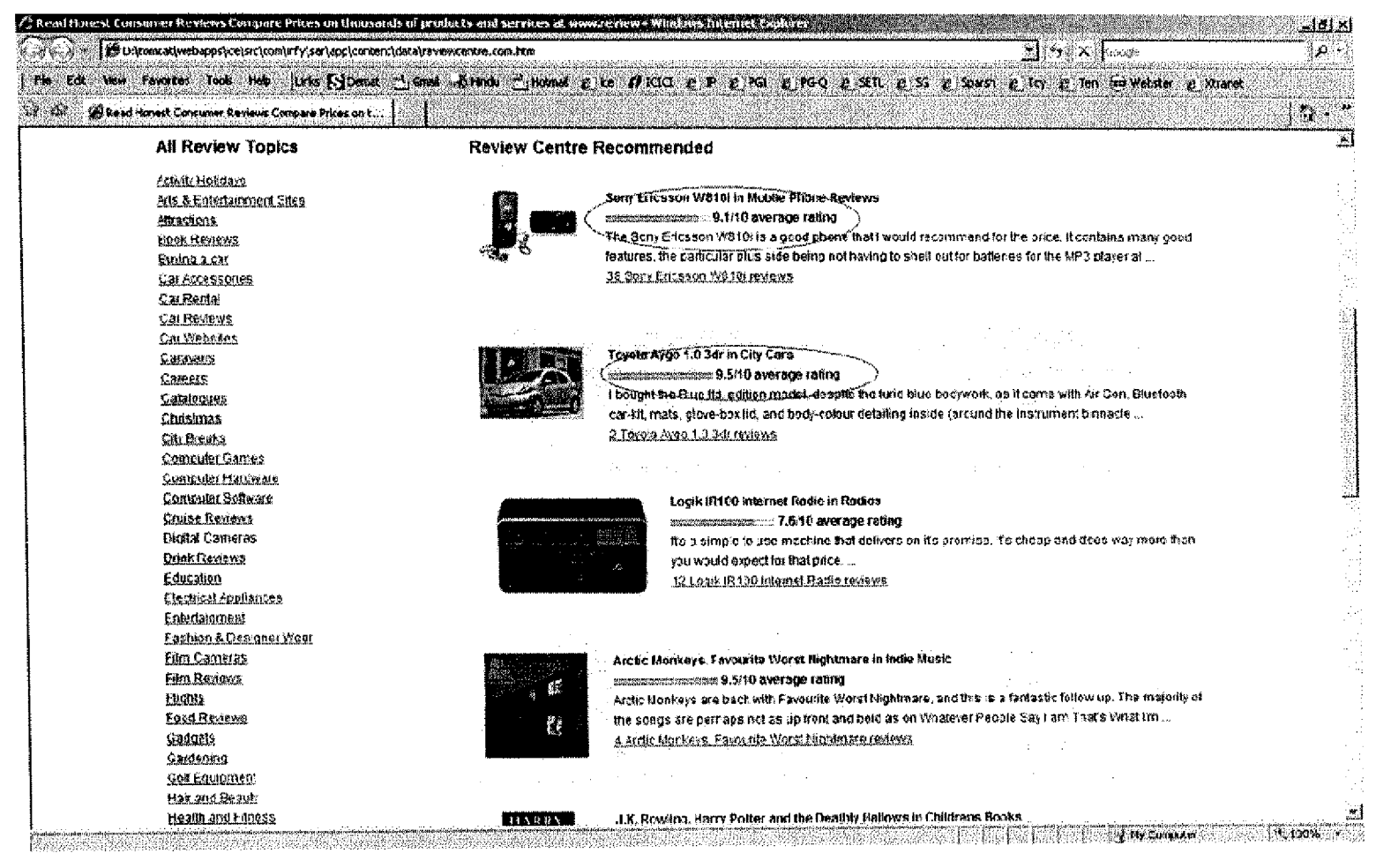

In yet another embodiment of the present invention, the rating generated by the rating handler is aggregated with pre-rated reviews of a product to obtain an overall rating. The pre-rated handler is a component that can be used to read images/texts from external websites which display the ratings given by various online customers or computed by an online vendor. An example of an online pre-rated review is illustrated in FIG. 7.

Figure 8:
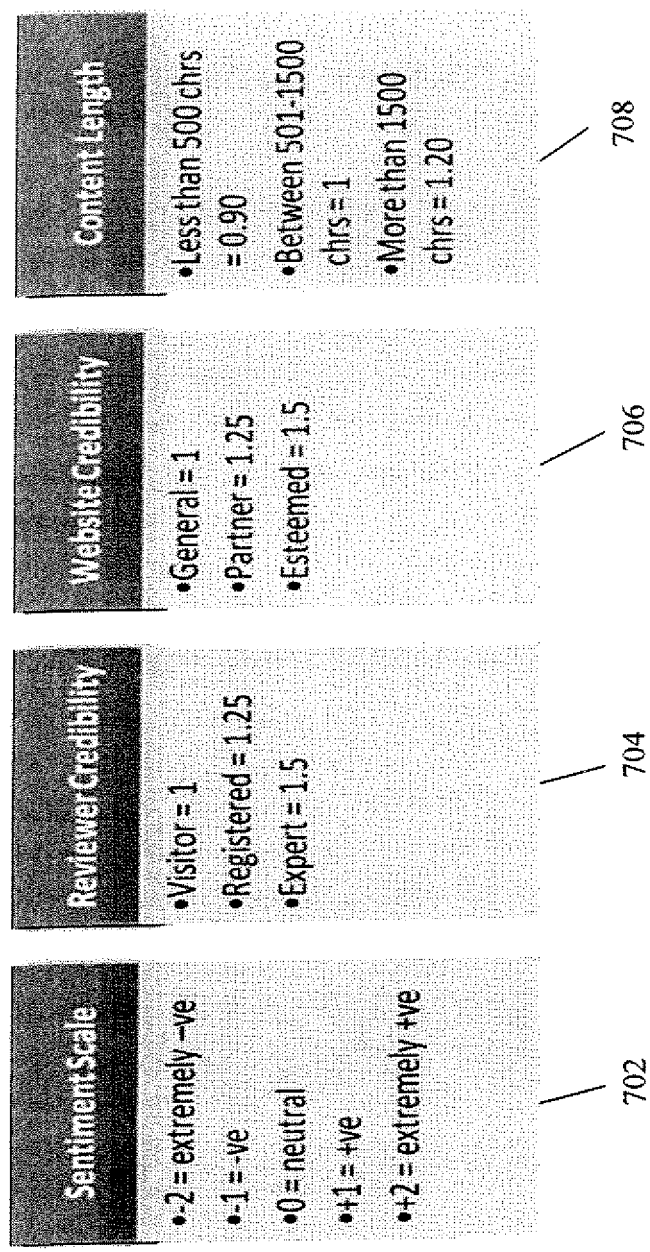
FIG. 8 illustrates a configurable scale implementing credibility parameters for determining a rating, in accordance with an embodiment of the present invention.

In yet another embodiment of the present invention, the rating handler implements a normalization approach to arrive at a rating. In one of the methods, the rating scores obtained by various methods are normalized to adjust extremely polarized frequently occurring comments toward the generally known average value. In an embodiment, this is done by calculating a Bayesian average. The formula used for calculating a Bayesian average is as follows:

$$\bar{x} = \frac{C\bar{m} + \sum_{i=1}^{n} x_i}{n + C}$$

where,
x̄=adjusted Bayesian average for the polarized content
C=any constant usually assigned close to the number of terms i.e. contents in this case
m̄=rating of the category/group
$x_i$=rating of each content
n=number of contents In another method using the normalized approach, weight factors are assigned to various credibility parameters as defined by the business as illustrated in FIG. 8. The weight factors are multiplied to the content ratings to obtain real rating values.

FIG. 7 illustrates an online pre-rated review, in accordance with an embodiment of the present invention. As shown in the figure, the circled portion indicates the rating given by an online reviewer for a mobile phone.

FIG. 8 illustrates a configurable scale implementing credibility parameters for determining a rating. In an embodiment of the present invention, a rating handler uses a normalized approach to calculate ratings for a customer feedback. In the normalized approach, weight factors are assigned to various credibility parameters, while configuring a scale. As shown in the figure, the sentimental scale 702 is configured using the parameters: reviewer credibility 704, website credibility 706, and content length 708. Reviewer Credibility 704 signifies how much credible a person writing a product review is to the business or society in large. Website Credibility 706 signifies how credible a website data source is to a business and Content Length credibility 708 signifies how much credible a review is in terms of its subjectivity measured as number of words. In an embodiment of the present invention, weights are assigned to the credibility parameters and the weight factors are multiplied to the content ratings to obtain real rating values. For example, as shown in the figure, for Reviewer Credibility 704, the weights assigned are 1 for visitor, 1.25 for registered user, and 1.5 for an expert.

Figure 9:
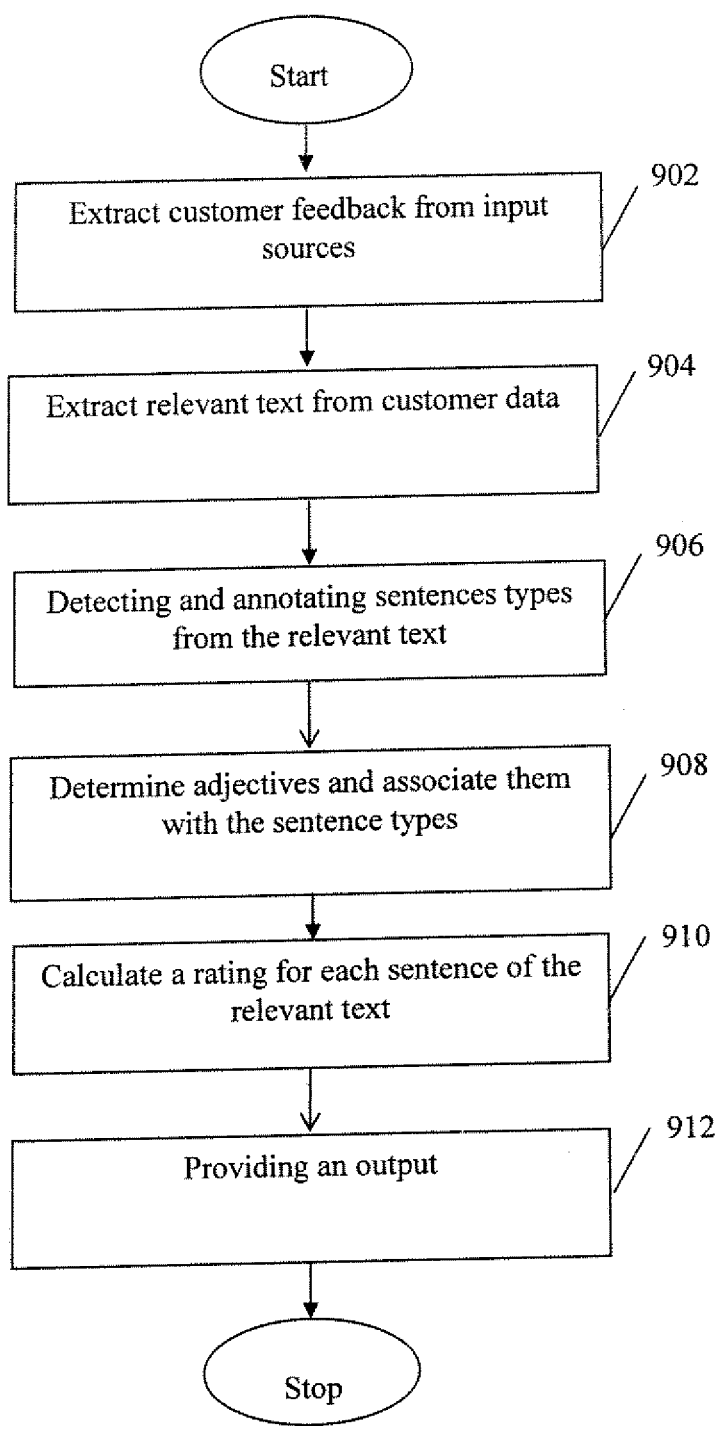
FIG. 9 illustrates a process flow diagram for semantic analysis of unstructured data in accordance with an embodiment of the present invention.

FIG. 9 illustrates a process flow diagram for a method for semantic analysis of unstructured data in accordance with an embodiment of the present invention. At step 902, customer feedback is extracted from input sources. In an embodiment of the present invention, the input sources include sources of data related to customer feedback, such as, digital sources, the internet, company databases, internal websites, fileservers, emails and news feeds. In an embodiment of the present invention, the method assigns and varies weights of the data sources in terms of their importance as perceived by the business. At step 904, relevant text is extracted from the customer feedback. In an embodiment, relevant text includes documents which interest the business, which essentially means that such documents will have texts or patterns of texts deemed relevant by the business. At step 906, relevant sentences are detected and annotated. In an embodiment, the annotation is performed by adding comments by looking for a pattern of words/alphabets and then marking them in the given text, generally following a look-up approach. Thereafter, tagging is done where individual words are tagged in the given test by referring to a lexicon, generally using a machine learning approach.

At step 908, relevant adjectives are identified from sentences and are associated with sentences types using a grammar handler and a corpus of text models. Subsequently, at step 910, a rating is calculated for each sentence. In an embodiment of the present invention, a rating is calculated multi-step logic spanning with each step having different weights as per business needs. In an example, direct assignments of numerical values to language sentiments are done e.g. adjective 'good' assigned a value of +1, bad as −1, and excellent as +2. In another example, business sentiments are classified using a custom domain based corpus created from business data. In yet another example, ratings from external systems, such as those appearing on websites, are mixed and aggregated with the calculated rating to obtain a collective rating. In yet another example, various credibility parameters as defined and enforced on the data sources and other system entities, and a rating scale is configured using the credibility parameters. At step 912, an output is provided based on the calculated ratings. In an embodiment, the output includes displaying graphs/charts and reports displayed to the user on a dashboard. In another embodiment, XML/RDF data feeds are provided to third party applications that illustrate object-oriented views of the results. In yet another embodiment of the present invention, the method exposes an API where applications can call the exposed function after conforming to defined input and output message schemas. This output mode is aimed at providing analytical feeds directly at the application level interface.

FIG. 10 illustrates an exemplary dashboard for providing output in accordance with an embodiment of the present invention. The figure illustrates graphs on a dashboard displaying the results of semantic analysis of customer feedback. Three different graphs in the figure illustrate the percentages of "type" of user outlook, such as, "positive", "extremely positive" and "negative" for three different features of a camera, respectively.

The present invention may be implemented in numerous ways including as a system, a method, or a computer readable medium such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A computer implemented method for semantically analyzing unstructured data, wherein the unstructured data is customer feedback comprising text for reviewing at least one of a product or service, the method comprising:
    extracting data related to customer feedback from one or more digital input sources;
    monitoring the one or more digital input sources to detect a plurality of parameters corresponding to each of said one or more digital input sources, wherein the detected plurality of parameters include business alliance and proximity, frequency of data updates, historical errors, data size, and number of concurrent system or user accesses corresponding to the digital input sources;
    assigning weights to the one or more digital input sources, using a processor, wherein assignment of weights is based on the detected plurality of parameters corresponding to each of the one or more digital input sources;
    extracting relevant text from the feedback data;
    detecting and annotating sentence types from the relevant text;
    determining relevant adjectives and associating them with the sentence types;
    calculating a rating for each sentence of the relevant text using at least the weight assigned to the corresponding digital input source; and
    providing an output in a pre-determined format.

2. The method of claim 1, wherein the step of extracting data related to customer feedback further comprises crawling through digital input sources to obtain text related to customer feedback, wherein the one or more digital input sources include at least one of indicated data sources and non-designated data sources.

3. The method of claim 1, wherein the step of extracting relevant text further comprises:
    stripping out irrelevant text from the customer data;
    staging the stripped text in a database; and
    cleansing the data to obtain the relevant text.

4. The method of claim 1, wherein the step of detecting and annotating sentence types further comprises the steps of:
    detecting the type of sentence, wherein the type of sentence comprises at least one of an affirmative sentence, an interrogative sentence and a negative sentence; and adding tags to each type of sentence to identify parts of speech.

5. The method of claim 1 further comprising using grammatical rules, linguistic patterns and corpus of text models to determine relevant adjectives and associating them with the sentence types.

6. The method of claim 5, wherein the step of calculating a rating for each sentence of the relevant text further comprises using a rating model for assigning ratings based on the relevant adjectives and the sentence types.

7. The method of claim 6 further comprising combining the results of the rating model with previously determined numeric ratings available from external websites to calculate a collective rating.

8. The method of claim 7 further comprising combining the use of the rating model with a configurable scale, wherein the configurable scale is configured by assigning weights to one or more credibility parameters of pre-rated reviews.

9. The method of claim 6, further comprising normalizing the results of the rating model by calculating a Bayesian average for the results.

10. A computer program product comprising a non-transitory computer usable medium having a computer readable program code embodied thereon for semantically analyzing unstructured data, wherein the unstructured data is customer feedback comprising text for reviewing at least one of a product or service, the computer program product comprising instructions that, when executed by a processor, cause the processor to perform a method comprising:
  extracting data related to customer feedback from one or more digital input sources;
  monitoring the one or more digital input sources to detect a plurality of parameters corresponding to each of said digital input sources, wherein the detected plurality of parameters include business alliance and proximity, frequency of data updates, historical errors, data size, and number of concurrent system or user accesses corresponding to the one or more digital input sources;
  assigning weights to the one or more digital input sources, wherein assignment of weights is based on the detected plurality of parameters corresponding to each of the one or more digital input sources;
  extracting relevant text from the feedback data;
  detecting and annotating sentence types from the relevant text;
  determining relevant adjectives and associating them with the sentence types;
  calculating a rating for each sentence of the relevant text using at least the weight assigned to the corresponding digital input source; and
  providing an output in a pre-determined format.

11. The computer program product of claim 10, wherein extracting data related to customer feedback comprises crawling through digital input sources to obtain text related to customer feedback, wherein the one or more digital input sources include at least one of indicated data sources and non-designated data sources.

12. The computer program product of claim 10, wherein the extracting relevant text further comprises:
  stripping out irrelevant text from the customer data;
  staging the stripped text in a database; and
  cleansing the data to obtain the relevant text.

13. The computer program product of claim 10, wherein detecting and annotating sentence types further comprises:
  detecting the type of sentence, wherein the type of sentence comprises at least one of an affirmative sentence, an interrogative sentence and a negative sentence; and
  adding tags to each type of sentence to identify parts of speech.

14. The computer program product of claim 10 further comprising using grammatical rules, linguistic patterns and corpus of text models to determine relevant adjectives and associating them with the sentence types.

15. The computer program product of claim 14, wherein calculating a rating for each sentence of the relevant text further comprises using a rating model for assigning ratings based on the relevant adjectives and the sentence types.

16. The computer program product of claim 15 further comprising combining the results of the rating model with previously determined numeric ratings available from the external websites to calculate a collective rating.

17. The computer program product of claim 16 further comprising combining the use of the rating model with a configurable scale, wherein the configurable scale is configured by assigning weights to one or more credibility parameters of pre-rated reviews.

18. The computer program product of claim 16, further comprising normalizing the results of the rating model by calculating a Bayesian average for the results.

* * * * *